3,454,202
GLASS FIBER CLOTH
Louis J. Kearn, 1661 Donner Ave.,
San Bruno, Calif. 94066
No Drawing. Filed Aug. 1, 1966, Ser. No. 569,042
Int. Cl. D06j 1/00
U.S. Cl. 223—28      3 Claims

ABSTRACT OF THE DISCLOSURE

Glass fiber cloth when utilized for decorative purposes such as draperies etc., may be pleated or otherwise shaped by coating the glass fiber strands in the cloth with a film of a thermoplastic resin. The resin coated cloth is mechanically restrained into the desired shape and while under such restaint is subjected to a heat treatment, as by live steam, to raise the temperature thereof to the softening point of the thermoplastic resin. While still under restraint the cloth is then cooled to room temperature whereby the shape is permanently retained therein.

---

The present invention relates to cloth produced from glass fibers, and more specifically to a method for improving the properties of such cloth and to enhance its utilization for decorative purposes.

Cloth made from glass fibers has found vastly expanding markets in recent years, especially in the areas of decorative utilization. Its utilization in such applications as drapery construction has vastly expanded due to its inherent dimensional stability, its freedom from sunlight deterioration, and its complete nonflammability.

However, even in such applications, glass fiber cloth has a number of deficiencies which have prevented its complete acceptance for such purposes. Specifically, such glass fiber cloth has a relatively low abrasion resistance, that is, the material tends to fray and crack when subjected to a continuous rubbing action. Further, the tiny glass fiber strands have a tendency to break whereby very tiny glass particles are released to the surroundings. These small glass particles if inhaled by an individual sometimes produce irritation of the mucous linings. Further these cracked or broken ends apparently create an irritating action on the skin whereby rashes sometimes develop in individuals coming into intimate contact with such materials.

Finally glass fibers are by their very physical nature extremely resistant to permanent bending, i.e., they are tremendously more resilient than other man-made or natural fibers. This resiliency results in the inability to set a particular shape into such fiberglass cloth. For instance, in the application to drapery manufacture, it is extremely desirable to have the drapery material hang in pleats when such draperies are pulled back away from the window or door opening. Draperies made of other materials, such as natural fibers like wool, linen, cotten, etc., and of man-made fibers such as rayon, acetate, dacron, etc., being not nearly as resilient as cloth made of glass fiber, may be permanently pleated when made into draperies so that they hang in a pleasing manner when pulled back away from the opening.

On the other hand, draperies made of fiberglass cloth, being of extremely resilient nature, cannot have permanent pleats placed therein. This resiliency and inability to be pleated results in fiberglass draperies having an unpleasing appearance when drawn back and also prevents them from hanging properly when in the fully closed position.

The present invention provides a means for treating glass fiber cloth to reduce the breaking properties of the glass fibers, to increase the abrasion resistance of glass fiber cloth, and to further permit the pleating and other shaping of such cloth by simple and ordinary means.

It is therefore an object of the present invention to provide an improved glass fiber cloth.

It is another object of the invention to provide a simple treatment for glass fiber cloth whereby its abrasion resistance is improved.

It is yet another object of the invention to provide an improved glass fiber cloth having reduced glass fiber breakage problems.

It is yet another object of the present invention to provide an improved glass fiber cloth which is easily shaped and pleated.

It is another object of the present invention to provide a method for treating glass fiber cloth to improve its abrasion resistance, reduce its irritation to human skin, and to improve its shapeability and pleatability.

Other objects of the invention will become apparent from the following description and claims appended hereto.

Briefly the invention comprises coating the strands of glass fiber cloth with a thermoplastic organic resin and subsequent treatment with heat while holding the cloth in the desired shape to set that shape into the cloth structure. The coating and subsequent heat treatment of the glass fiber cloth measurably decreases the cloth's tendency to crack and also measurably decreases the skin irritation qualities previously alluded to. In addition it has been found that glass fiber cloth coated according to the invention will retain indefinitely the shape into which it is set during the heat treatment. Thus, for instance, glass fiber cloth made into draperies may be permanently pleated in the manner of draperies constructed of other conventional materials.

It has been found that the qualities imparted to the glass fiber cloth through treatment by the present invention continues for an indefinite period of time, although it is generally necessary to retreat the cloth after cleaning or after exposure to severe moisture conditions. Further it has been found that the treatment of the present invention improves the aforementioned qualities of glass fiber cloth regardless of the particular weave and without regard to the closeness or looseness of weave.

With respect to the thermoplastic organic resin applied to the glass fiber cloth strands, it has been found that any thermoplastic resin is suitable. Vinyl resins, being universally available and of relatively low cost, are preferred for use in the invention. Vinyl resins are also particularly suitable for use in the present invention in view of the fact that they soften at the temperatures available on conventional steam pleating equipment in common use throughout the industry. It should be understood, however, that other thermoplastic resins are also contemplated as being useful in the present invention.

In carrying out the process of the invention it is necessary to coat essentially completely all of the individual strands in the glass fiber cloth with the thermoplastic resin. This is most conveniently done in the case of vinyl resins by immersing the glass fiber cloth in an aqueous emulsion of the vinyl resin. In this respect concentrated emulsions of vinyl resins are well known and are commercially available from textile treatment chemical houses.

In actual practice it is effective to dilute the concentrated emulsion with water before immersion of the glass fiber fabric therein. While the dilution of the concentrated thermoplastic resin emulsion is not particularly critical, however, it is generally advantageous to dilute the thick concentrated emulsion to a much thinner consistency whereby the glass fiber resin is more easily immersed and wetted thereby.

In any event the glass fiber cloth is thoroughly immersed in and completely wetted by the diluted resin emulsion. The wetted cloth with the thermoplastic resin deposited thereon is then removed from the emulsion and permitted to air dry whereby the water evaporates leaving the thermoplastic resin deposited on all strands of the cloth.

After a thorough drying in air at room temperature the treated glass fiber cloth is ready for subsequent heat treatment to set the desired shape therein.

The dried cloth with resin adherent thereto is placed in any suitable holding device to set the desired shape therein. For instance in the case of draperies, pleating machines are commonly in use which retain the drapes at the top and bottom ends thereof in a pleated configuration. The drapery in the pleated configuration is stretched within the pleating machine to hold it pleated along its entire length. While being held in the desired shape, the glass fiber cloth is subjected to a heat treatment to soften the thermoplastic resin covering each individual strand thereon.

The temperature of the cloth should be raised to a point sufficient to thoroughly soften the adherent thermoplastic resin. In the instance of vinyl coated glass fiber cloth it is only necessary to subject the cloth to live steam heated to a temperature of up to approximately 320° F., or somewhat less, in order to thoroughly soften the thermoplastic coating. Superheated steam is further preferred in the treatment of the present invention since it thoroughly penetrates all of the cloth interstices to completely reach all of the cloth strands and thoroughly heat the thermoplastic resin thereon.

Of course other suitable means may be utilized to apply heat to the cloth, such as hot air jets, etc. In any event the entire glass fiber cloth is heated to a temperature sufficient to completely soften all of the resin deposited thereon.

After insuring that the entire cloth panel has been heated to the indicated temperature, the heat source is removed therefrom while the cloth is retained in the shaped position. While being retained in the shaped position, the cloth is permitted to return to room temperature at which point it may be removed from the shaping device.

Having been subjected to the process as described above, the treated cloth will retain the shape set into it for an indefinite period of time as pointed out above. In the case of glass fiber draperies, for instance, it has been found that the drapes will remain pleated even though subjected to sunlight for long periods of time when hung at window or door openings.

The thermoplastic resin coating will remain permanently on the glass fiber cloth and the shaping will be retained therein for an indefinite period of time unless some coating removal agent is applied thereto. For instance in the case of vinyl resin, it has been found that thoroughly wetting the cloth with water will at least partially remove the resin coating thereon and thereby eliminate the pleatability thereof.

However, unless some such external agent is utilized to remove the resin coat therefrom, the treated glass fiber cloth will retain the properties pointed out supra. In any event, should the coating be inadvertently removed from the glass fiber cloth, it is only necessary to reapply the thermoplastic resin in accordance with the process of the invention to restore all of the properties heretofore noted.

It should also be noted that glass fiber cloth treated in accordance with the present invention is unaltered in appearance or color and simply acquires the added property of shape retention as described above. The "hand" of the fabric is not appreciably changed, but the skin irritation properties often present in untreated glass fiber cloth is noticeably reduced. Further, the resin coating tends to hold small particles of the glass fiber strands which may be inadvertently broken within the cloth structure whereby the irritating glass particles often released in the vicinity of glass fiber cloth are also greatly reduced.

What is claimed is:

1. A process for pleating and shaping glass fiber cloth draperies comprising contacting said cloth with a solution containing a thermoplastic organic resin, drying a coating of said resin on the individual strands comprising said cloth, restraining the cloth into pleats, heating the cloth and resin coating thereon to a temperature sufficient to soften said resin, cooling the cloth while restraining it in pleats, and finally releasing the cooled cloth from restraint whereby said cloth retains said pleats.

2. The process of claim 1 wherein said thermoplastic organic resin is vinyl resin.

3. The process of claim 2 wherein the cloth and vinyl resin coating is heated with live steam.

References Cited

UNITED STATES PATENTS

| | | | |
|---|---|---|---|
| 2,678,686 | 5/1954 | Schulz | 161—132 X |
| 2,681,866 | 6/1954 | Auchterlonie | 117—10 |
| 2,906,441 | 9/1959 | Liebeskind | 223—28 |
| 2,929,738 | 3/1960 | Bateson et al. | 117—126 |
| 2,970,345 | 2/1961 | Wangner | 117—10 X |

WILLIAM D. MARTIN, *Primary Examiner.*

D. COHEN, *Assistant Examiner.*

U.S. Cl. X.R.

117—10, 126